United States Patent

[11] 3,584,543

| [72] | Inventor | Stanley W. Herman<br>Indianapolis, Ind. |
|---|---|---|
| [21] | Appl. No. | 817,901 |
| [22] | Filed | Apr. 21, 1969 |
| [45] | Patented | June 15, 1971 |
| [73] | Assignee | General Motors Corporation<br>Detroit, Mich. |

[54] ELASTIC HOLDDOWN MEMBER FOR THE CYLINDER BLOCK OF A FLUID PUMP/MOTOR
3 Claims, 4 Drawing Figs.

[52] U.S. Cl. ............................................. 91/486, 91/499
[51] Int. Cl. ...................................... F04b 1/20
[50] Field of Search ............................ 103/162; 91/198, 200, 486, 499; 60/53 A; 92/57

[56] References Cited
UNITED STATES PATENTS

| 2,255,962 | 9/1941 | Benedek | 91/486 |
| 2,972,955 | 2/1961 | Richter | 91/486 |
| 2,976,863 | 3/1961 | Duer et al. | 91/499 |
| 3,133,418 | 5/1964 | Froebe | 60/53 (X) |
| 3,292,553 | 12/1966 | Hann | 103/162 |

FOREIGN PATENTS

| 948,031 | 11/1962 | Great Britain | 103/162 |

*Primary Examiner*—William L. Freeh
*Attorneys*—E. W. Christen, A. M. Heiter and D. F. Scherer

ABSTRACT: A solid resilient annular ring member is deformed by axial distortion or by compression between the drive shaft and the cylinder block of the pump/motor. The force resulting from the deformation holds the cylinder block against the pump/motor valving surface to provide a holddown force that counteracts lifting forces induced by the rotating masses of the pump/motor and by fluid forces between the cylinder block and the valving surface and provides an initial sealing force.

PATENTED JUN 15 1971

3,584,543

INVENTOR.
Stanley W. Herman
BY
Donald F. Sekerer
ATTORNEY

ELASTIC HOLDDOWN MEMBER FOR THE CYLINDER BLOCK OF A FLUID PUMP/MOTOR

This invention relates to fluid energy translating devices and more particularly to axial piston pump/motor having a rotating cylinder barrel and a stationary valve plate.

In prior-art pump/motors of this configuration, the static holddown force between the cylinder barrel and the valve plate is developed through the use of a compression spring while the drive is imparted to the cylinder barrel through a spline connection with the drive shaft. The present invention provides a holddown force or initial sealing force through the use of an annular ring of resilient material such as rubber or plastic which is deformed between the drive shaft and the cylinder barrel to urge the cylinder barrel into contact with the valve plate.

In one embodiment, the annular ring is bonded to the shaft and the cylinder barrel. During assembly, the cylinder barrel contacts the valving surface before the shaft is fully located on the support bearing. As the shaft is drawn into the bearing, the annual ring is deformed axially to load the cylinder barrel against the valving surface to insure initial sealing. The bonding between the shaft and the cylinder block provides a drive connection therebetween to eliminate the need for a spline connection.

In another embodiment, the annular ring is located in a cavity between shoulder portions on the cylinder barrel and the drive shaft. As the shaft is drawn into the support bearing, the cylinder barrel contacts the valving surface; then the annular ring is deformed to fill the cavity between the shoulder portions. The force required to deform the annular ring holds the cylinder barrel against the valving surface to provide the initial sealing force. A spline connection between the shaft and the cylinder barrel is used to transmit the driving force between the shaft and the cylinder barrel.

It is therefore an object of this invention to provide in an improved axial piston pump/motor a resilient annular ring deformed between the shaft and the cylinder barrel to urge the cylinder barrel into sealing engagement with the valving surface.

Another object of this invention is to provide in an improved fluid energy translating device a resilient annular ring bonded to and deformed between the drive shaft and the cylinder barrel to provide a drive connection therebetween and an initial sealing force between the cylinder barrel and the valving surface.

These and other objects and advantages of this invention will be apparent to those skilled in the art from the following description and drawings in which.

Figure 1:
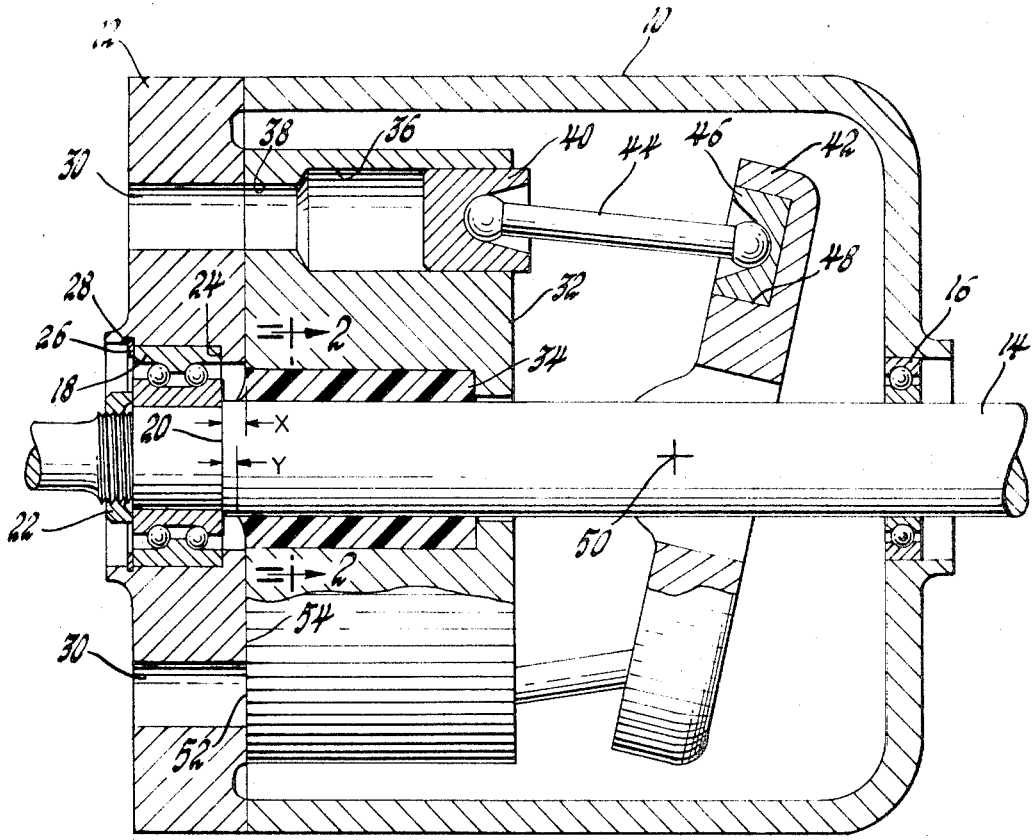
FIG. 1 is an elevational view in cross section of a fluid pump/motor showing one embodiment of the invention.

Referring to the drawings, there is shown in FIG. 1 a fluid energy translating device such as a hydraulic pump or motor having a housing 10, a valve plate 12 secured to the housing 10 and a drive shaft 14 rotatably supported in bearings 16 and 18, secured in the housing 10 and valve plate 12, respectively. The inner race of bearing 18 abuts a shoulder 20 on the shaft 14 and is held in abutment therewith by a fastener 22 which is threaded on the shaft 14. The outer race of the bearing 18 abuts a shoulder 24 of the valve plate 12 and is held in engagement with the shoulder 24 by a snap ring 26, secured in a groove 28. The valve plate 12 has a plurality of openings or ports 30 which are adapted to transmit fluid to and from the pump.

A cylinder barrel 32 is disposed circumjacent a portion of the drive shaft 14 and is drivingly connected to the shaft 14 by a resilient annular ring member 34 which is bonded to the shaft 14 and the cylinder block 32. The cylinder block 32 has a plurality of bores 36 each having a port 38 which are connected and disconnected with the ports 30 when the cylinder block 32 is rotated to permit the transmission of fluid to and from the cylinder bores 36. Piston members 40 are slidably disposed in the cylinder bores 36 and are operatively connected to a swashplate 42 through piston rods 44 and shoes 46. The shoes 46 are slidably disposed in an annular track 48 on the swashplate 42. The swashplate 42 is nonrotatable relative to the rotating axis of the drive shaft 14, but is pivotable about an axis 50 to change the angular position of the swashplate 42 relative to the shaft 14 and the cylinder block 32. The swashplate 42 is pivotably mounted to the housing 10 by pins not shown. A change in the angular position of the swashplate 42 causes a change in the stroke of piston 40 and therefore the displacement of the pump/motor.

The cylinder block 32 has an end sealing surface 52 which abuts a sealing surface 54 of the valve plate 12. Sealing contact between the sealing surfaces prevents leakage of large amounts of fluid between the cylinder block and the valve plate. During operation there is a controlled amount of leakage between these members to permit the cylinder block to ride on a fluid film so that metal-to-metal contact between the cylinder block 32 and the valve plate 12 does not occur. The cylinder block 32 is maintained in this close sealing relationship with the valve plate 12 by the annular resilient member 34. Prior to the assembled condition shown, in which the shoulder 20 is at a distance X from the end surface 52, the cylinder block is maintained at a distance Y from the shoulder 20 by the annular member 34. However, during assembly, as the shaft 14 is drawn into the bearing 18 by the fastener 22, the cylinder block 32 contacts the valve plate 12 such that the annular member 34 is deformed until the distance X is established. The force required to deform the annular ring member 34 holds the cylinder block 32 in contact with the valve plate 12 thus establishing the initial sealing force between the cylinder block 32 and the valve plate 12.

As mentioned above, the annular member 34 is bonded to both the drive shaft 14 and the cylinder block 32. Thus, as the drive shaft 14 is rotated, the cylinder block 32 is driven by the drive shaft through the annular ring member 34. Since the unit may also be used as a motor when fluid pressure is admitted to the cylinder bores 36, the cylinder block 32 is caused to rotate. The rotation of the cylinder block is transmitted to the drive shaft 14 through the annular ring member 34. The resilient annular ring member 34, for satisfactory operation, is made from a material which is resistant to deterioration by petroleum products, ozone and ageing and has a high damping capacity to dissipate vibratory energy such as Buna N rubber or polyurethane plastic.

During pump or motor operation, there are many forces which tend to cause separation between the cylinder block 32 and the valve plate 12. One of these forces is due to the centrifugal force developed by the piston 40 and piston rod 44 as they rotate with the cylinder block 32. Another separation force which can occur depends on the hydraulic balance which is designed into the cylinder block 32 and valve plate 12. These two members can be designed such that the pressure due to fluid leakage between the surfaces 52 and 54 is balanced by the pressure force developed by the area differential between the cylinder bore 36 and the opening 38. This pressure balance can be designed to create a holddown force, that is, a force on the cylinder block in the direction of the valve plate 12 or it can be designed to be a lifting force, that is, a force on the cylinder block away from the valve plate 12. This pressure balance force can also be designed to counteract the centrifugal force imposed on the cylinder block by the piston 40 and rod 44. However, when these two forces are balanced, the balance point is designed for specific speed and pressure conditions. Therefore, when the pump is operating at a speed other than the design speed or a pressure other than the designed pressure, the cylinder block 32 may have sufficient unbalance lift off the valve plate 12. Should the cylinder block lift from the valve plate 12, the flow of fluid between the cylinder block ports 38 and the valve plate ports 30 will be discontinued and system pressure will be reduced to a minimum. The annular ring member 34 prevents the cylinder block from lifting off by adding to a holddown force to the cylinder block which counteracts the tendency of the cylinder block to lift. With the use of this resilient ring member, the hydraulic balance between the cylinder block and valve plate is, therefore, not as critical as pumps or motors using a compression spring to provide a holddown force between the cylinder block and the valve plate, since a compression spring will have a much lower spring rate than the annular ring 34.

Figure 3:
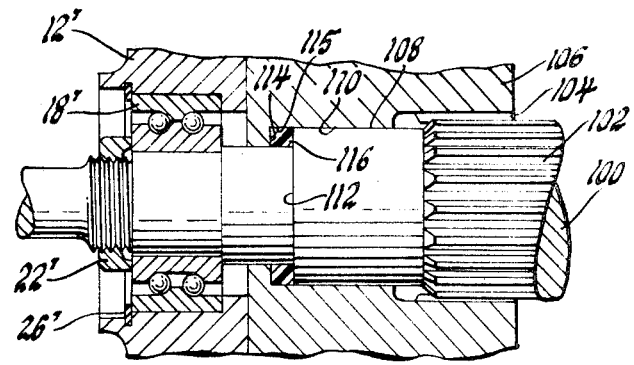
FIG. 3 is a partial cross-sectional view of a pump/motor showing another embodiment of the invention.
Figure 2:
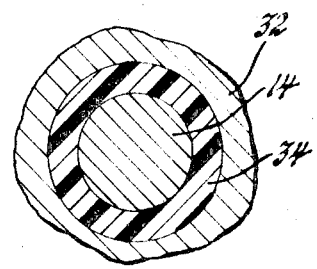
FIG. 2 is a sectional view taken along line 2-2 in FIG. 1.
Figure 4:
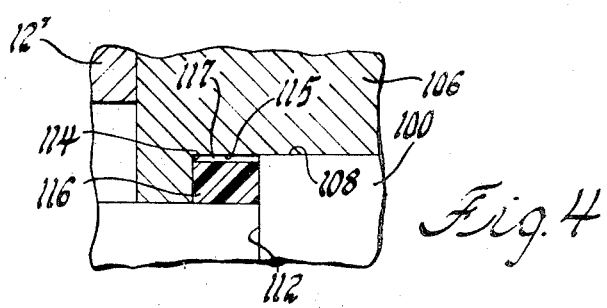
FIG. 4 is a partial cross-sectional view of the pump/motor in FIG. 3 before complete assembly.

The pump/motor shown in FIG. 3 also has a drive shaft 100 similar to the drive shaft 14 which is rotatably mounted in a valve plate 12' by a bearing 18' in a manner similar to that described above for FIG. 1. The drive shaft 100 has a spline 102 which engages a spline 104 on a cylinder block 106. The shaft 100 also has a cylindrical portion 108 which is circumjacent to a cylindrical portion 110 of the cylinder block 106. The cylindrical portion 108 has an end shoulder 112 and the cylindrical portion 110 also has a shoulder portion 114. The shoulder portions 112, 114 cooperate to form a cavity 115. An annular resilient ring 116 is disposed between the shoulders 112 and 114 as seen in FIG. 4 such that the cavity 115 has a void or empty space 117 at the instant the cylinder block 106 contacts the valve plate 12'. However, as the shaft 100 is drawn into the bearing 18 by the threaded member 22', the annular ring 116 is deformed to completely fill the cavity 115 between the shoulders 114 and 112 after the cylinder block 106 has contacted the valve plate 12'. Thus, it is seen that the force required to deform the annular resilient ring member 116 is transmitted through the cylinder block 106 to the valve plate 12' to provide an initial sealing force between these components. The drive between the cylinder block 106 and the shaft 100 is provided by the splines 102 and 104.

The annular resilient ring member 116 is designed such that when the required sealing force between the cylinder block 106 and 112 is present, the cavity 115 between the shoulders 112, 114 will be completely filled. Thus, any separating forces which occur between the cylinder block 106 and the valve plate 12' will be prevented from separating the two components due to the substantially solid axial connection between the cylinder block and the shaft 100, provided by the annular ring 116. The annular ring 116 is manufactured from the same material used for the annular ring 34.

The foregoing description and drawings are not intended as limitations as obvious modifications will be apparent to those skilled in the art.

What I claim is:

1. A fluid energy translating device comprising drive shaft means for transmitting energy to and from said device; rotatable cylinder means; valve plate means including a valving surface adjacent said cylinder means, bearing means for rotatably supporting said drive shaft means, a fluid passage means for conducting fluid to and from said cylinder means through said valving surface; resilient annular ring means secured to and drivingly connecting said cylinder means and said drive shaft means; and means operatively connecting said drive shaft means and said bearing means for deforming said resilient means between said drive shaft and said cylinder means to urge said cylinder means into contact with said valving surface to provide an initial sealing force therebetween.

2. A fluid energy translating device comprising a rotatable shaft member; a rotatable cylinder member having a sealing surface; a valve plate having a stationary surface adjacent said cylinder member, a bearing means rotatably supporting said shaft, and fluid passage means for conducting fluid to and from said cylinder member through said stationary surface; resilient annular ring means bonded to said shaft member and said cylinder member for providing a drive connection therebetween; and means operatively engaging said shaft member and said bearing means for deforming said resilient means between said shaft member and said cylinder member to urge said cylinder member into contact with said stationary surface for providing an initial sealing force between said sealing surface and said stationary surface.

3. A fluid energy translating device comprising drive shaft means for transmitting energy to and from said device; rotatable cylinder means having a sealing surface; valve plate means including a valving surface adjacent said sealing surface, bearing means for rotatably supporting said drive shaft means, and fluid passage means for conducting fluid to and from said cylinder means through said valving surface; a resilient annular ring secured to and drivingly connecting said cylinder means and said drive shaft means; and means operatively engaging said drive shaft means and said bearing means for deforming said resilient ring between said drive shaft means and said cylinder means to urge said cylinder means sealing surface into contact with said valving surface to provide an initial sealing force therebetween.